Jan. 17, 1939.  A. C. BRYAN  2,144,359
MOTOR VEHICLE
Filed March 14, 1936   4 Sheets-Sheet 1
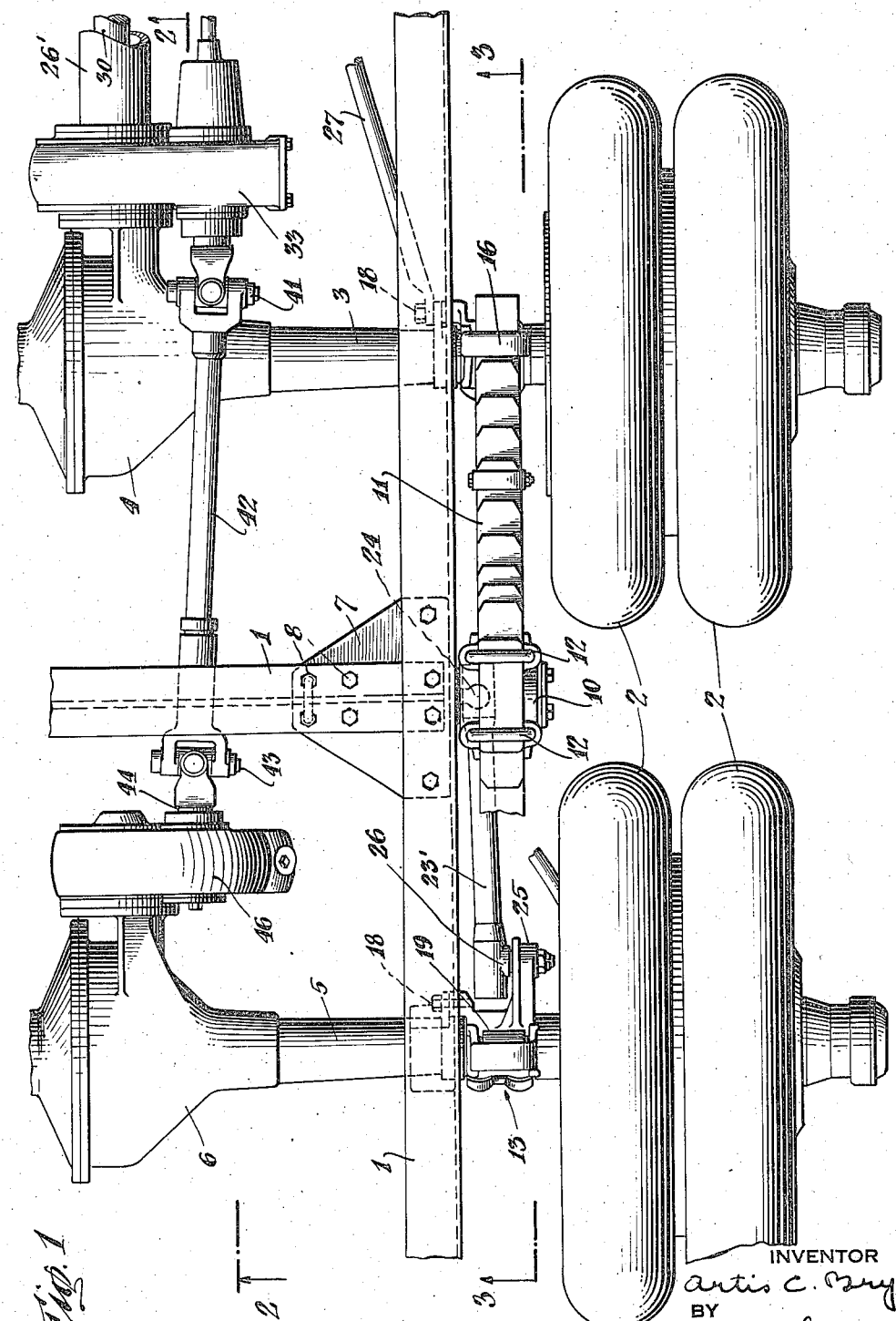

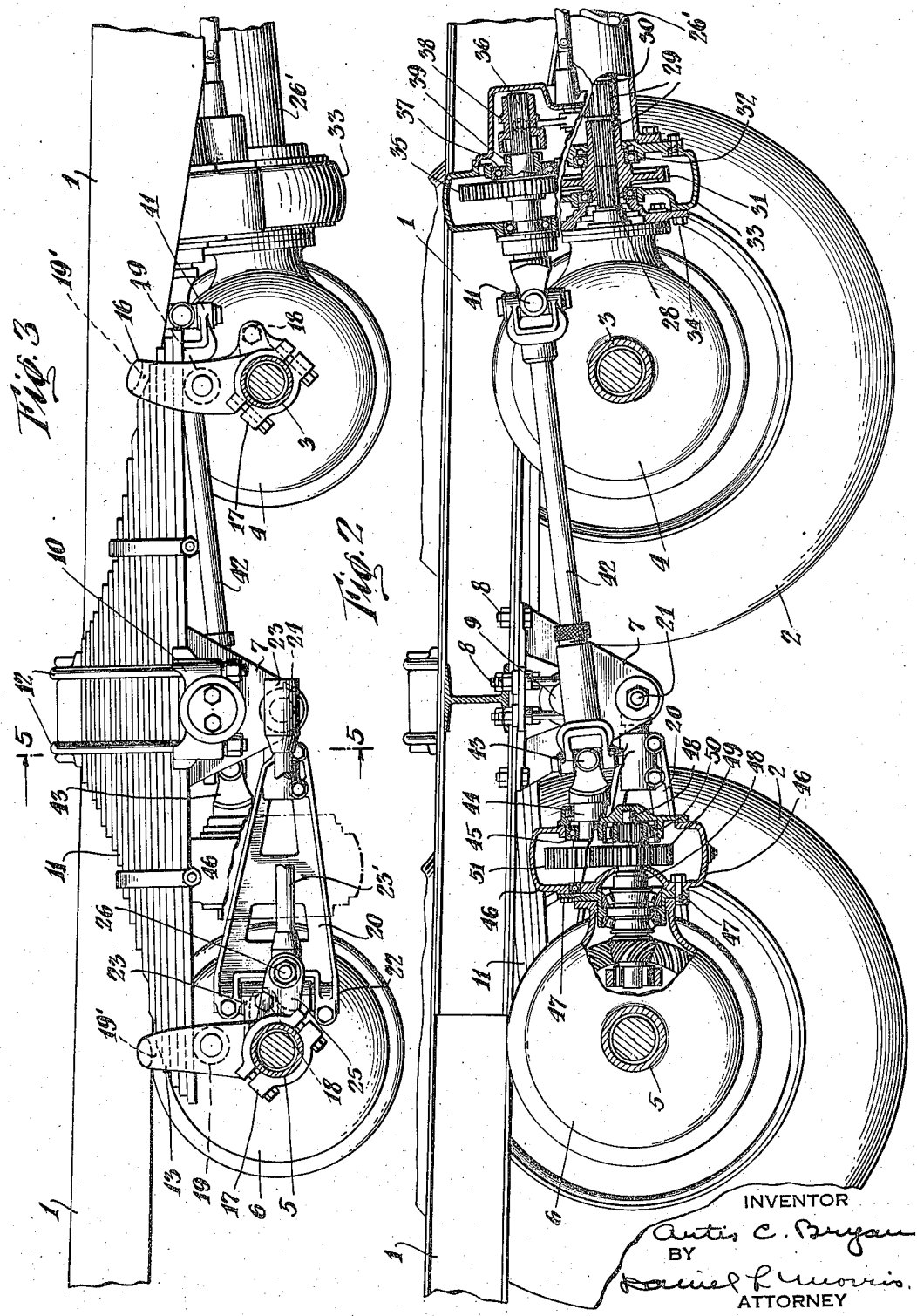

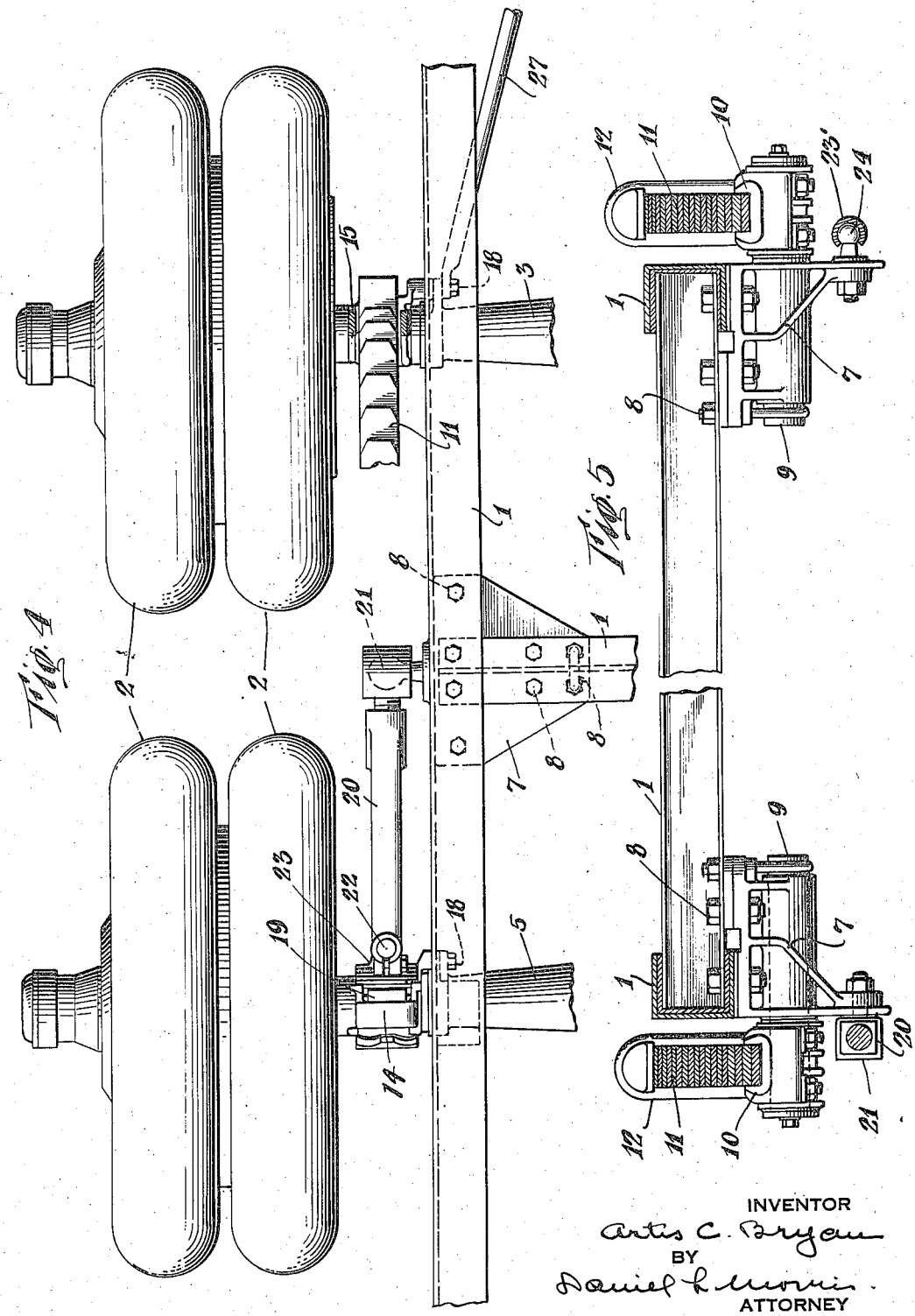

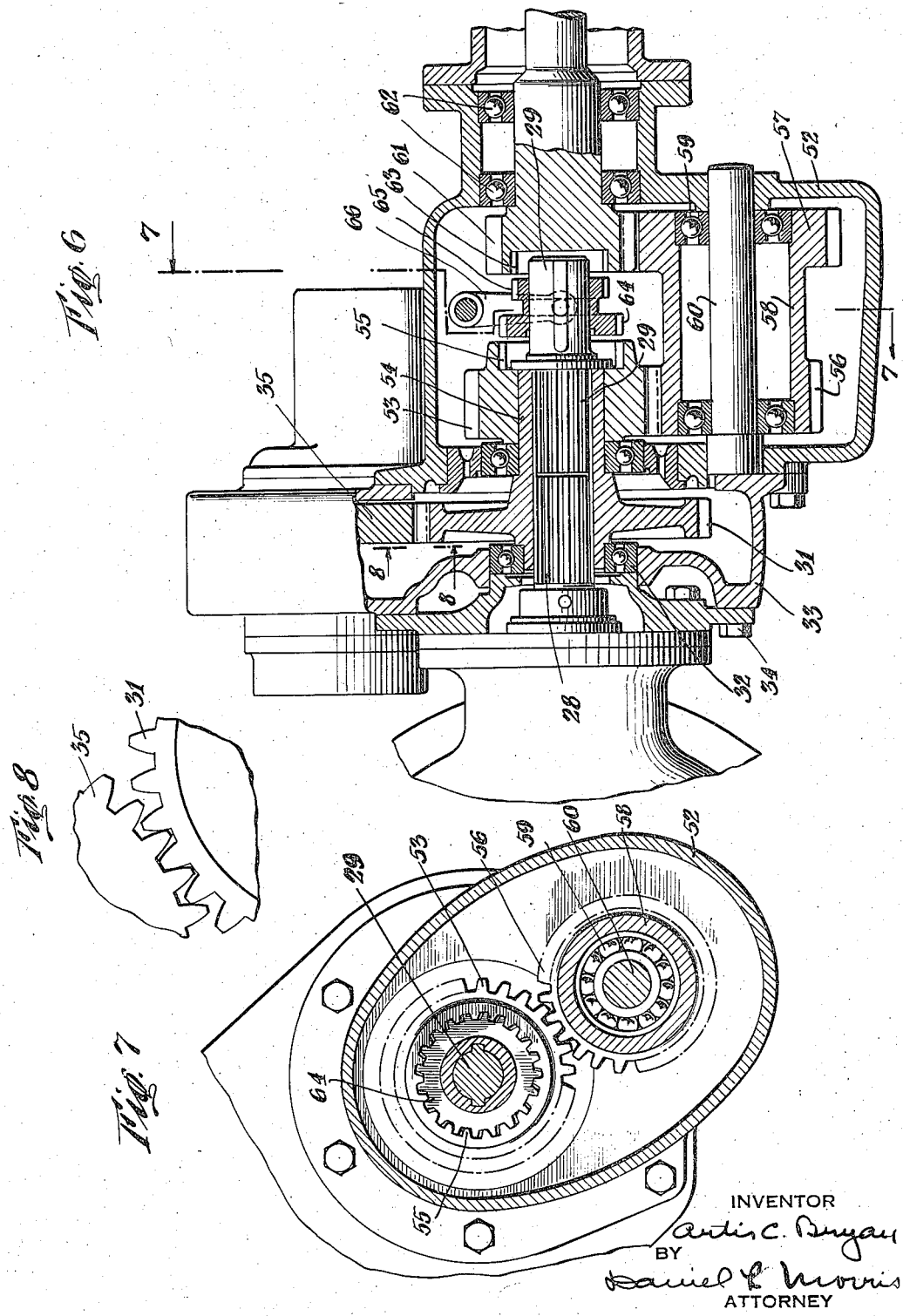

Patented Jan. 17, 1939

2,144,359

UNITED STATES PATENT OFFICE 2,144,359

MOTOR VEHICLE

Artis Chester Bryan, Syracuse, N. Y.

Application March 14, 1936, Serial No. 68,853

6 Claims. (Cl. 180—22)

This invention relates to motor vehicles and more particularly to motor trucks of the type that employ dual rear axle drives and multiple driving wheels.

An object of the invention resides in the construction of a truck in which all of the driving wheels have maximum traction regardless of the type of terrain over which the truck is operated and that has the maximum flexibility with the result that, regardless of the load and the character of the terrain, no damaging strains are transmitted to the operating mechanism.

It has been found, in the usual type of dual rear axle driven truck, excessive strains are set up in the driving mechanism with the result that the useful life of the truck is greatly reduced. This is traceable to several causes which are inherent in the construction and which prevent the attainment of the desirable traction and the necessary flexibility to overcome the deleterious results. The method of spring suspension is a contributing factor. In the usual construction the springs have three points of attachment, at their centers to the frame and at their ends to the rear axle housings. While, in this type of spring suspension, the end connections are through shackles which permit forward and rearward movements of the axles, there is a positive connection that prevents the movement of the axles transversely. Moreover, the shortness of the drive shaft between the two rear axles is calculated to prevent flexibility and to transmit unduly all of the road shocks to the driving mechanism.

Then again, in this type of truck the driving connections between the source of power and the the adjacent rear axle and also between the two rear axles is positive with the result that no flexibility is obtained.

All of these contributing factors, result, as I have said, in a gear that does not have sufficient flexibility to dissipate the strains incident to the travel of the truck over the terrain, rough or smooth, before they are transmitted to the driving mechanism with the destructive results mentioned.

It is here mentioned, as a matter of theory, that when a truck is being operated over a smooth terrain and one of the driving tires is less worn than the remainder, for instance, so that it obtains greater traction, there is a resistance produced by that tire. Were the truck operating over rough terrain this resistance would be dissipated should a bump sufficient to cause the wheel to leave the ground, be encountered. In other words, when such a bump is encountered and the wheel leaves the ground the wheel spins more rapidly than the remaining wheels rotate and thus dissipates the built-up resistance. However, when the wheel again returns to the terrain the contact causes a renewed building up of resistance which is not dissipated until the wheel again leaves the ground. However, when the truck is traversing smooth terrain so that no bumps are encountered, the resistance hereinbefore referred to is not dissipated. It may cause the disintegration of the tires or it may cause excessive strains and wear on the driving mechanism.

But, even when the truck is operating over rough terrain and the strain is relieved by the wheel leaving the terrain, the sudden shock produced when the wheel returns to the terrain is transmitted to the driving mechanism with destructive results.

In the instance where the truck is operating over such uneven surfaces that one side drops down with relation to the other and the spring connections and drive shaft are of the character that has hereinbefore been described, the strains incident to this result in a distortion and a setting up of undue destructive influences. In the usual type of dual rear axle driven truck the power transmitting connection between the source of power and the foremost of the rear axles and between the foremost and rearmost of the rear axles is positive. The result of this is that the starting torque is transmitted to the rearmost axle, whereas it should be taken up by the foremost of these axles. In other words, the starting of the truck should be accomplished by the wheels of the foremost rear axle before the transmission of power to the rearmost axle.

It has been found that there is a relationship between the spring mounting, the driving connection between the source of power and the foremost of the rear axles, the driving connection between the foremost and rearmost of the rear axles, and the connections for absorbing the driving and braking torques, and that when these elements are properly co-related the result is a gear, in which the maximum traction is obtainable over either rough or smooth terrain without the production of undue strains on the driving mechanism, and with the production of the maximum flexibility.

The construction disclosed and claimed in the instant application embodies that proper co-relation with the production of the results hereinbefore described.

In the drawings:

Figure 1 is a fragmentary plan view showing the side of the vehicle on which the drag link is located;

Fig. 2 is a vertical sectional view on line 2—2 of Figure 1;

Fig. 3 is a vertical sectional view on line 3—3 of Figure 1;

Fig. 4 is a fragmentary plan view showing the side of the vehicle opposite to that shown in Figure 1 and on which the torque arm is located;

Fig. 5 is a section on line 5—5 of Figure 3;

Fig. 6 is a sectional view of a modification of the invention;

Fig. 7 is a section on line 7—7 of Figure 6; and

Fig. 8 is a fragmentary section on line 8—8 of Figure 6.

In the drawings a truck chassis which includes a frame 1 that is supported at the rear by two parallel rear driving axles each end of each of which may carry single or multiple driving wheels 2 is disclosed. The foremost of these axles is provided with an axle housing 3 and a differential housing 4 while the rearmost is provided with an axle housing 5 and a differential housing 6.

The attachment between the frame and the axle housings is made in the following manner:

A bracket 7 is attached to each side of the frame 1 by means of bolts 8. A shaft 9 is fixedly mounted in each of these brackets and carries a spring saddle 10 at its outer end, which saddles are adapted to oscillate on the shafts. A laminated leaf spring 11 is carried by each saddle and is secured thereto by a clamp 12. The ends of the spring 11 extend into spring chairs 13, 14, 15 and 16 which are rigidly attached to the axle housings 3 and 5 by clamps 17 and are held in upright positions by attachment at 18 to lugs on the axle housings. Each of these chairs is provided with a roller 19 whose axis is transverse of the spring and on which the spring bears and on which it is adapted to freely move both axially of the roller and also transversely to its axis. It is to be noted that the width of each spring is less than the distance between the side walls of each of the chairs which construction permits the lateral movement of the spring on the roller 19 (see Fig. 4). It is also to be noted that there is suitable space at 19', between the end of each spring and the upper or cross bar of the chair so that the spring is capable of moving away from the roller in an upward direction. There is, therefore, no positive connection between the springs and the axle housings. Thus the springs are adapted to move in all directions with respect to the housings. The springs being thus connected the bogie will adapt itself to all conditions of the terrain over which the vehicle is passing. For instance, when the foremost driving axle is supported in a horizontal position, the rearmost driving axle may drop when the wheels on both ends of the axle encounter a depression. This is because of the fact that the springs are free to move vertically in the spring chairs.

Moreover, because of this spring arrangement the wheel on either end of the rearmost driving axle is adapted to drop into a depression without affecting or transmitting strain to the supporting mechanism on the other end of the rearmost axle or to the foremost axle.

Then again, the rear axle is adapted to move transversely of the chassis or otherwise expressed, longitudinally of itself, without affecting or transmitting any strain to the foremost axle. This is because of the space between the springs and the side walls of the spring chairs.

What has been said of the possible movements of the rearmost axle independent of the foremost axle is equally true of the foremost axle, since the method of mounting the springs is the same on each.

It is to be realized that the relieving of the transmission of strains from one axle to the other relieves the imposition of any strains upon the driving mechanism.

On one side of the frame a torque arm 20 is mounted. This torque arm is connected to the adjacent bracket 7 by a ball and socket connection 21 which permits universal movement of the torque arm. At the rear end the torque arm is mounted on a vertical pivot 22 that is carried by an extension 23 of the clamp 17 which holds the adjacent spring chair 14 to the rear axle housing 5.

On the opposite side of the frame a drag link 23' extends between the frame and the rear axle housing 5 and is attached to the adjacent bracket 7 by a ball and socket connection 24 and to an extension 25 on the adjacent spring saddle 13 by ball and socket connection 26. The construction and assembly of this torque arm 20 and of the drag link 23' makes it possible for the rear axle to have the movements that have been described.

The foremost of the rear axles is provided with a torque tube 26' and with radius rods 27.

Thus it will be seen that each axle transmits its driving and braking torques to the frame independently of the other.

In order that the driving power may be transmitted simultaneously or independently to the driving axles and selectively to the rearmost driving axle the following mechanism is provided:

The pinion shaft 28 of the differential in the foremost driving axle is provided with an extension 29 which is keyed to the shaft through the medium of the hub of the gear 31 and to which extension the tubular drive shaft 30 is splined the extension 29 extending into the tubular shaft 30. Thus, the power is transmitted from the source to the differential of the foremost drive axle.

In order that the power may be selectively transmitted to the rearmost drive axle a gear 31 is splined on the shaft 28—29 in fixed relation which shaft is supported by bearings 32 in a housing 33 that is bolted at 34 to the forward extension of the differential housing. This gear 31 meshes with a gear 35 that has a running fit on the shaft 36 which shaft is mounted within the housing 33 on bearings 37. A clutch element 38 is fixed on the shaft 36 against relative rotating movement but is free to move longitudinally of the shaft and to engage a complementary clutch element 39 rigid with the gear 35. The clutch element 38 is adapted to be shifted by a shifter arm which is connected to a rod extending within the reach of the operator.

Thus, the power may be transmitted to the differential of the foremost axle independently or it may be transmitted, in addition, to the shaft 36. This shaft 36 is connected by means of a universal joint 41 to a relatively long drive shaft 42 which in turn is connected by a universal joint 43 to a relatively short shaft 44 that is mounted on bearings 45 within a casing 46 which casing is attached to the differential housing of the rearmost driving axle at 47. The pinion shaft 48 of the rear axle differential extends into the housing 46 and carries a gear 49 that is splined thereto in fixed relation and is supported by bearings 50. This gear meshes with a gear 51 which is splined to the shaft 44 in fixed relation.

It is to be noted that shafts 44 and 36 are located on the same side of the corresponding pinion shafts and that the shaft 44 is located above the pinion shaft 48 with the result that a minimum angularity and a maximum length of the universally mounted drive shaft 42 is obtainable, which arrangement assists in permitting a free flow of power through the driving line.

The mating gears 31 and 35 and the mating gears 49 and 51 instead of being cut and engaged according to the accepted mathematical formula, that is to say, where the teeth have the accepted clearance, are cut and assembled so that the teeth have an unusual amount of clearance, or in other words, an amount larger than the accepted clearance (see Figure 8). This clearance is sufficient to permit a limited amount of back lash in the gears.

The above described features of the invention cooperate each with the other in such manner that high tire mileage, maximum traction and minimum strain on the operating parts is attained. The rear axles with their wheels are free to drop, rise, weave and negotiate curves without one axle transmitting the strain to the other and without either transmitting the strain to the driving mechanism. The wheels are free to leave the traction surface and to return thereto without spinning and without causing any undue strain to be transmitted to the operating parts. The chassis is free, upon the encounter of a sudden bump, to rise without tending to raise any of the wheels from the ground and without destroying the traction. The provision of the back lash between the gears 49 and 51 and the gears 31 and 35 prevents the momentary excessive strain on the driving mechanism incident to the operation of the vehicle over uneven surfaces at high speeds. In other words, this back lash acts in effect as a strain dissipator. The presence of the clutch members 38 and 39 makes it possible to use the foremost driving wheels, independently as a driving unit at which time the rearmost driving wheels will operate idly and will support their share of the load. This is sometimes desirable when a vehicle is passing over smooth surfaces at high speed.

Moreover, in starting, the lost motion between the gears that has been described makes it possible to initially give, when the clutch elements 38 and 39 are engaged, the vehicle its starting impetus by means of the front drive wheels and then bring into play, in addition, the rear drive wheels.

In Figure 6 there is shown a modification by means of which a different gear ratio between the source of power and the axles may be obtained.

In the drawings I have illustrated this feature in the form of a reducing gear set but it is to be understood that instead of an underdrive gear ratio an over-drive gear ratio may be used. In the housing 52 which is bolted to the forward end of the housing 33 a transmission gear set is located. This includes a gear 53 that its mounted on and is free to rotate on an extension or hub 54 of the gear 31. This gear 53 has a clutch face 55. The gear 53 meshes permanently with a relatively smaller gear 56 which is rigid with a gear 57. When used as an underdrive this gear is relatively larger than the gear 56. Both of these gears 56 and 57 are cut on a drop forged steel assembly, thus forming a one-piece countershaft assembly. This assembly is supported on a countershaft 60 and bearings 59. The gear 57 permanently meshes with a relatively smaller gear 61 on the end of the power transmission shaft which is mounted on bearings 62 within the casing 52. This gear 61 carries a clutch member 63. On the extension of the pinion shaft 28 and 29 a dual clutch member having a clutch element 64 adapted to engage the clutch element 55 and the clutch element 65 adapted to engage the clutch element 63 is mounted slidably on the shaft but rotatable therewith. A shifter arm 66, having a suitable operating rod extension to a point within reach of the driver, is engaged with the clutch member so that it may be shifted to engage the clutch elements 64 and 55 or 65 and 63.

Thus the gear ratio between the source of power and the driving wheels may be changed without sacrificing any of the traction, durability and flexibility that flows from the construction that has heretofore been described.

It will be realized that the connection between the springs that support the frame on the axles is in effect a floating connection so that the rearmost axle is free to move in every direction except forwardly and rearwardly which movements are prevented by the torque arm and drag link and so that the foremost of the driving axles is free to have similar movements but is prevented from having forward and rearward movements by the radius arms and torque tube. This floating support is effective to increase the flexibility of the vehicle when the vehicle is provided with a transmission gear or the transmission gear is omitted.

While certain details of construction have been shown and described for illustrative purposes, it has to be understood that the invention is not limited to those details except in so far as they are set forth in the claims.

What is claimed is:

1. In a vehicle, in combination with a pair of driving axles and their differential gears of a gear connected to the pinion shaft of each differential, a gear meshing with each of said aforementioned gears, a shaft extending between and connected with said last mentioned gears, said shaft being arranged above and on one side of the vertical plane passing through both pinion shafts there being sufficient space between the intermeshing gears to permit lost motion therebetween.

2. In a vehicle the combination with a pair of driving axles and their differential gearing including pinions of a gear connected to the pinion shaft of each differential, a gear meshing with each of said aforementioned gears, a shaft extending between and connected to said last mentioned gears, said shaft being located on one side of a plane passing through the axles of the pinions of the differentials, there being sufficient space between the aforesaid intermeshing gears to permit lost motion therebetween.

3. In a vehicle the combination with a pair of driving axles and their differential gearing including pinions of a gear connected to the pinion shaft of each differential, a gear meshing with each of said aforementioned gears, a shaft extending between and connected to said last mentioned gears, said shaft being located on one side of a plane passing through the axles of the pinions of the differentials, there being sufficient space between the aforesaid intermeshing gears to permit lost motion therebetween; means for actuating the pinion shaft of the forward differential, and means for disconnecting the shaft that extends between the last mentioned gears from the pinion shaft of the forward differential.

4. In a vehicle, a frame, a pair of driving axle assemblies including differentials, a power shaft connected with the pinion shaft of one differential, a gear rigid with the pinion shaft of each differential, an auxiliary gear meshing with each of the first-mentioned gears, a drive shaft rigid with and extending between said auxiliary gears, and a pair of springs pivotally mounted on the frame and resting freely on the axles to permit the latter to move in lateral and vertical directions, there being sufficient lost motion between the auxiliary gears and their meshing gears to supplement the action of the differentials.

5. In a vehicle, a frame, a pair of driving axles including differentials, a power shaft having driving connection with one differential, a gear operatively associated with each differential, an auxiliary gear meshing with each of the first-mentioned gears, a drive shaft operatively connected with and extending between the auxiliary gears, and a pair of springs pivotally mounted on the frame and resting freely on the axles to permit the latter to move in lateral and vertical directions, there being sufficient lost motion between the auxiliary gears and their meshing gears to supplement the action of the differentials.

6. In a vehicle, a frame, a pair of driving axles including differentials, a power shaft having driving connection with one differential, a gear operatively associated with each differential, an auxiliary gear meshing with each of the first-mentioned gears, a drive shaft operatively connected with and extending between the auxiliary gears, a clutch between said last-mentioned shaft and one of said auxiliary gears, and a pair of springs pivotally mounted on the frame and resting freely on the axles to permit the latter to move in lateral and vertical directions, there being sufficient lost motion between the auxiliary gears and their meshing gears to supplement the action of the differentials.

ARTIS CHESTER BRYAN.